UNITED STATES PATENT OFFICE.

FRANKLIN R. CARPENTER, OF DENVER, COLORADO.

PROCESS OF TREATING ORES.

SPECIFICATION forming part of Letters Patent No. 678,457, dated July 16, 1901.

Application filed March 13, 1901. Serial No. 51,007. (No specimens.)

*To all whom it may concern:*

Be it known that I, FRANKLIN R. CARPENTER, a citizen of the United States, residing at Denver, in the county of Arapahoe and State of Colorado, have invented certain new and useful Improvements in the Treatment of Ores, of which the following is a specification.

My invention has for its object, primarily, the development of a process of smelting involving the employment of a special slag and producing therewith a carrier, such as matte or metal, for the precious metals, and will find its most advantageous application in parts of Colorado and other granitic mining sections where the ores consist largely of altered granites, phonolites, and similar rocks high in silica, alumina, and the alkalies.

The particular ores to which my invention has reference are those of Cripplecreek, Colorado, although I do not wish to be understood as limiting myself to those ores, as my invention is capable of a wider application.

The Cripplecreek ores, which I am now treating by my improved process, are of the following general analysis: silica, sixty per cent. to sixty-two per cent.; alumina, seventeen per cent. to twenty per cent.; alkalies, twelve per cent. to fifteen per cent., and iron two and one-half per cent. to three and one-half per cent. The remainder is made up of small quantities of sulfur, lime, magnesia, &c. These ores have been treated by several wet processes, but are smelted only with the greatest difficulty. The large smelting-works cannot use more than twenty per cent. of these ores in their furnace charges, and far better results are had if the percentage of Cripplecreek ores does not exceed fifteen per cent. The great difficulty seems to be that the ores readily soften high up in the furnace, form slags at a low temperature, but which at their formation-point are very viscous, and do not flow readily from the furnace.

In a normal ferrous and calcic silicate it is now known that an increase of silica or alumina will greatly lower the formation-point of the silicate; but the silicate so formed is viscous. It is also known that the alkalies, while very fluxing, have a similar effect. The action of the various elements entering into the Cripplecreek ores is to intensify each other's action and, while readily melting, form slags which are sticky and viscous and which are not suited for metallurgical work. When smelted with other ores, they impart this characteristic of viscosity to the slags formed directly in proportion to the amount of Cripplecreek ores employed.

Now I have discovered at a very great cost that slags into which the Cripplecreek and other aluminous and alkaline ores enter may be readily smelted by the addition of magnesia, which, while raising the formation-point of the slags, nevertheless permits their formation at a point at which they are fluid enough for good metallurgical work and that the difficulties heretofore had in the smelting of these ores may be cheaply and readily overcome. By its use I am also enabled to scorify larger amounts of alumina, decrease the specific gravity of the slag, and to make slags that are freer from the precious metals. As stated in the patent granted me June 13, 1893, in all writings upon the subject of precious-metal smelting magnesia is dwelt upon as a very undesirable base. It is only known recently why this is so. It is because it raises the formation-point of certain silicates, which in general calls for more fuel, and in the presence of lead and other volatile metals this would mean an increased loss by volatilization and scorification, so that in general the objection to its use is well founded; but in the particular cases to which I refer—namely, the high-silica slags at Deadwood, quoted in the above-mentioned patent, and the highly-aluminous slags formed from the Cripplecreek ores—it becomes useful upon account of this very property, as such slags are at their formation-point too viscid to flow from the furnace and require the addition of some other base that will raise the smelting-point and permit them to be fluid at the point of formation. In smelting the aluminous ores of Cripplecreek I have been entirely unsuccessful with common limestone, but am entirely successful with the use of dolomite. The former will not make slags that will flow from the furnace, except that they be greatly superheated, while the latter will make slags which are successful metallurgically, being very thin, of low specific gravity, and giving a good separation of matte and slag. By its use I very greatly increase the percentage of Cripple-creek or other aluminous ores in the smelting charge and find that a slag carrying about forty per cent. silica, fifteen per cent. ferrous oxid, seventeen per cent. lime, ten per cent. magnesia, and ten per cent. alumina plus the remaining bases gives excellent results and may be called the "type-slag," although I am able to vary any of its constituents at least five per cent. either way. In general, however, the magnesia should approximate in percentage the alumina, and the sum of the alumina and silica should not vary greatly from fifty per cent. of the slag.

In carrying out my invention I use an ordinary matte blast-furnace. The smelting charge consists of dolomite, aluminous and alkaline ores, and copper and iron ores, the latter to produce the necessary oxid for the slags and to be in sufficient quantity to form also the necessary matte or other carrier. The proportions are so estimated that the charge should yield a slag of the type above mentioned. The process differs in no way from ordinary matte-smelting, save that magnesia is used to overcome the evil of alumina and that both enter the slag about in the proportions described.

Having described my invention, what I claim as new, and seek to protect by Letters Patent, is—

The improved method of fluxing aluminous ores carrying gold and silver, which consists of the following steps: first, mixing with the ores a sufficient quantity of flux, containing magnesia, to form a slag, which will have the percentages of its main constituents within the following limits: silica, thirty-two per cent. to forty-three per cent.; lime fifteen per cent. to twenty-five per cent.; magnesia, five per cent. to fifteen per cent.; alumina, five per cent. to fifteen per cent., with other bases up to one hundred per cent.; second, applying heat to the mixture substantially in the manner described.

In testimony whereof I have hereunto subscribed my name.

FRANKLIN R. CARPENTER.

Witnesses:
 E. REYBOLD, Jr.,
 ARTHUR HOWE CARPENTER.